Patented Mar. 28, 1939

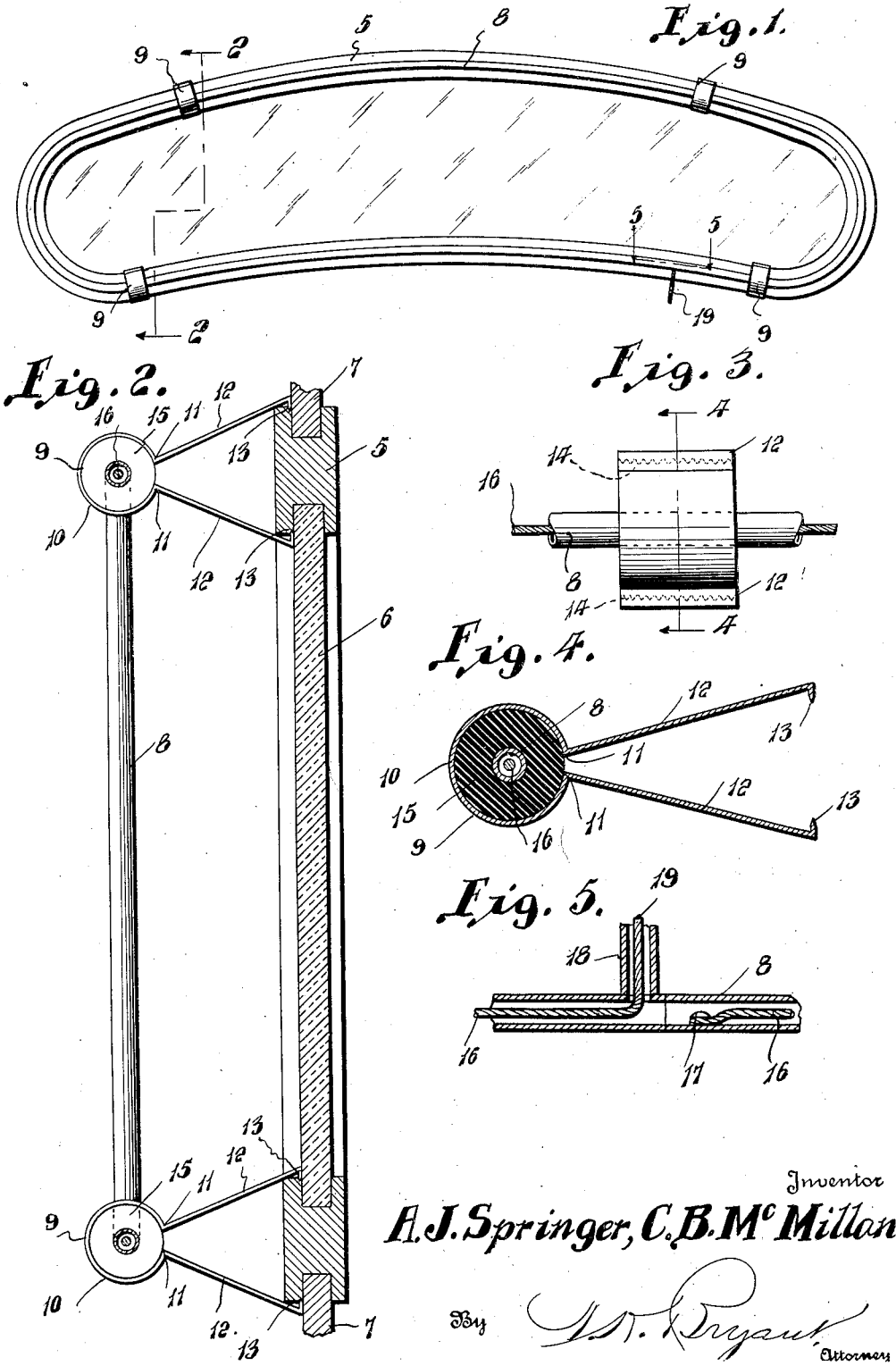
March 28, 1939. A. J. SPRINGER ET AL 2,151,997
RADIO ANTENNA FOR MOTOR VEHICLES
Filed Nov. 12, 1936

2,151,997

UNITED STATES PATENT OFFICE 2,151,997

RADIO ANTENNA FOR MOTOR VEHICLES

Alfred J. Springer and Chester B. McMillan, Oklahoma City, Okla.

Application November 12, 1936, Serial No. 110,512

1 Claim. (Cl. 250—33)

This invention relates to certain new and useful improvements in radio antennae for motor vehicles.

In order to accomplish radio reception in present day motor vehicles, antennae have been provided in the top of a vehicle, being built-in between the roof structure and the interior upholstering. It is also common practice to install radio antennae in motor vehicles by suspending an antenna under the running board of the car, in order that the same may be out of sight and removed from obstructions.

Heretofore, it has been the common practice to install an antenna under the running board of a motor vehicle when the vehicle is provided with a solid metal top, known in the trade as the turret top, in order that the upholstering and other fixtures of appointment on the interior of the car will not be disturbed.

The above practice is objectionable in view of the fact that antennae installed on the underside of motor vehicles pick up static disturbances caused by the car or motor vehicle travelling over street car tracks, concealed electric conductors under the roadway and magnetic iron deposits or strata in the earth. In the other type of aerial, which is adapted to be mounted between the roof and the interior upholstering structure of a motor vehicle, reception is not accomplished to the maximum degree, in view of capacity effects produced by the body structure which in present-day motor vehicles is a combination of iron or steel and wood, creating considerable static and interference to complete reception.

It will be obvious that both types of antennae are objectionable in view of the close proximity of one to the ground and of the difficulty of installation of the other type mounted in the vehicle top between the roof structure and interior lining. In the present invention it is proposed to overcome the above objections and disadvantages by attaching an antenna to the frame structure of a motor vehicle windshield or window member suitably insulated therefrom to prevent body capacity effects.

It is a primary object of this invention, to provide an antenna which may be detachably secured to the windshield frame of a motor vehicle and which will be neat in appearance thereby adding to the attractiveness of the motor vehicle body lines and forming adequate means for accomplishing maximum radio reception.

It is also a further object of this invention, to form the antenna of a tubular member in which there is located a wire having one end connected to the tube adjacent the outlet of the other end of the wire whereby the wave length of the antenna may be increased but still being of a size as to be compactly attached to a vehicle windshield frame, or in front of the said opening or any window or other opening of the vehicle.

Other objects and advantages of the invention will become apparent during the course of the following description, taken with the accompanying drawing and in which, Figure 1 is a plan view of the antenna embodying this invention, illustrating the same attached to a motor vehicle windshield frame;

Figure 2 is a vertical cross-sectional view taken on line 2—2 of Figure 1, looking in the direction of the arrows and illustrating the manner in which the antenna is insulated from the windshield frame and supported thereby;

Figure 3 is a plan view partly broken away, illustrating one of the insulators and supporting members for carrying the antenna;

Figure 4 is a vertical cross-sectional view taken on lines 4—4 of Figure 3, looking in the direction of the arrows, illustrating further the manner in which the antenna is insulated from the supporting clip and showing in detail the arrangement of the parts; and Figure 5 is a horizontal cross-sectional view taken on lines 5—5 of Figure 1, illustrating the lead-in wire connecting the antenna.

In the drawing, wherein for the purpose of illustrating the invention and wherein like reference characters will be employed to designate like parts throughout the same, the reference character 5 will generally be employed to designate the metal frame of a motor vehicle windshield having a panel glass 6 which in present-day structures is formed of non-shatterable glass. Usually the windshield frame on sedan and coupe type models is hinged along the upper edge to allow the windshield to swing upon a horizontal pivot away from the vehicle and admits air to the interior of the car. In order to form a tight water-proof joint between the windshield frame and body structure a rubber gasket 7 is embedded in the windshield frame 5 as clearly shown in Figure 2.

The invention comprises a tubular member 8 preferably of metal and of the same configuration as the windshield frame so that the tube 8 may be supported therefrom at spaced intervals by brackets 9. Each bracket includes a cylindrical portion 10 having the ends as at 11 bent at right angles or substantially tangential to the cylindrical portion 10 to form legs 12. The free ends of the legs 12 are provided with foot portions 13 serrated along their inner edges as at 14 to clamp and grip upon the windshield frame 5. It is intended to force the pronged feet 13 in between the space where the windshield panel 6 is anchored in the frame 5 and the rubber packing member 7 is anchored in the frame 5.

The supports 9 are preferably formed of a springy material having sufficient resiliency to urge the legs 12 toward each other causing the foot portions 13 to tightly clamp and grip the windshield frame 5. Any number of supports 9 may be provided in order to adequately support and maintain the tube 8 in position.

Interposed between the supports 9 and the tube 8 are insulating blocks 15 which prevent grounding of the tube 8 to the body of the motor vehicle since the frame 5 is connected to the body by a hinge connection, it is obvious that the tube 8 would be grounded unless insulation blocks 15 were provided.

Located within the tube 8 is an antenna wire 16 having one end fastened to the tube 8 as at 17 and extending clear around the tube to the outlet as at 18 where the lead-in wire 19 may be conducted to the interior of the vehicle for connection with the receiving set. In this manner, the tube 8 forms the aerial as well as the wire 16 and said tube may be formed of copper or brass or an alloy including copper and brass or may further be formed of an Austenaetic metal including traces of copper and brass.

It will be noted that the antenna may be easily installed upon the frame 5 of a motor vehicle windshield by first positioning the desired number of insulator blocks 15 upon the tube 8 and then surrounding each of the insulator blocks 15 with supporting members 9. The tube 8 may be held in position while the foot portions 13 of the supports are forced into engagement with the metal frame 5 of the windshield.

It is obvious that the form of the invention herewith shown and described is to be taken as the preferred embodiment and that the antenna may be mounted on other windows of the motor vehicle such as the side and rear windows and still produce the same effective results.

It is to be understood that further modifications may be made without departing from the spirit of the invention or the scope of the subjoined claim.

Having thus described the invention, what is claimed is:

In combination, a motor vehicle having a window frame with a glass pane in the frame, of an antenna carried by said frame in laterally spaced relation thereto, said antenna including a wire, insulators arranged at spaced intervals of said wire and means for supporting the antenna on the window frame including brackets each formed of a strip of resilient metal bent upon itself to provide a partially closed loop at the bight thereof clampingly engaged with an insulator, legs diverging from the loop portion of the bracket and normally movable towards each other and an angle foot on the free end of each leg with the two feet directed towards each other and adapted for bighting engagement with the windshield frame.

ALFRED J. SPRINGER.
CHESTER B. McMILLAN.